United States Patent Office 2,734,106
Patented Feb. 7, 1956

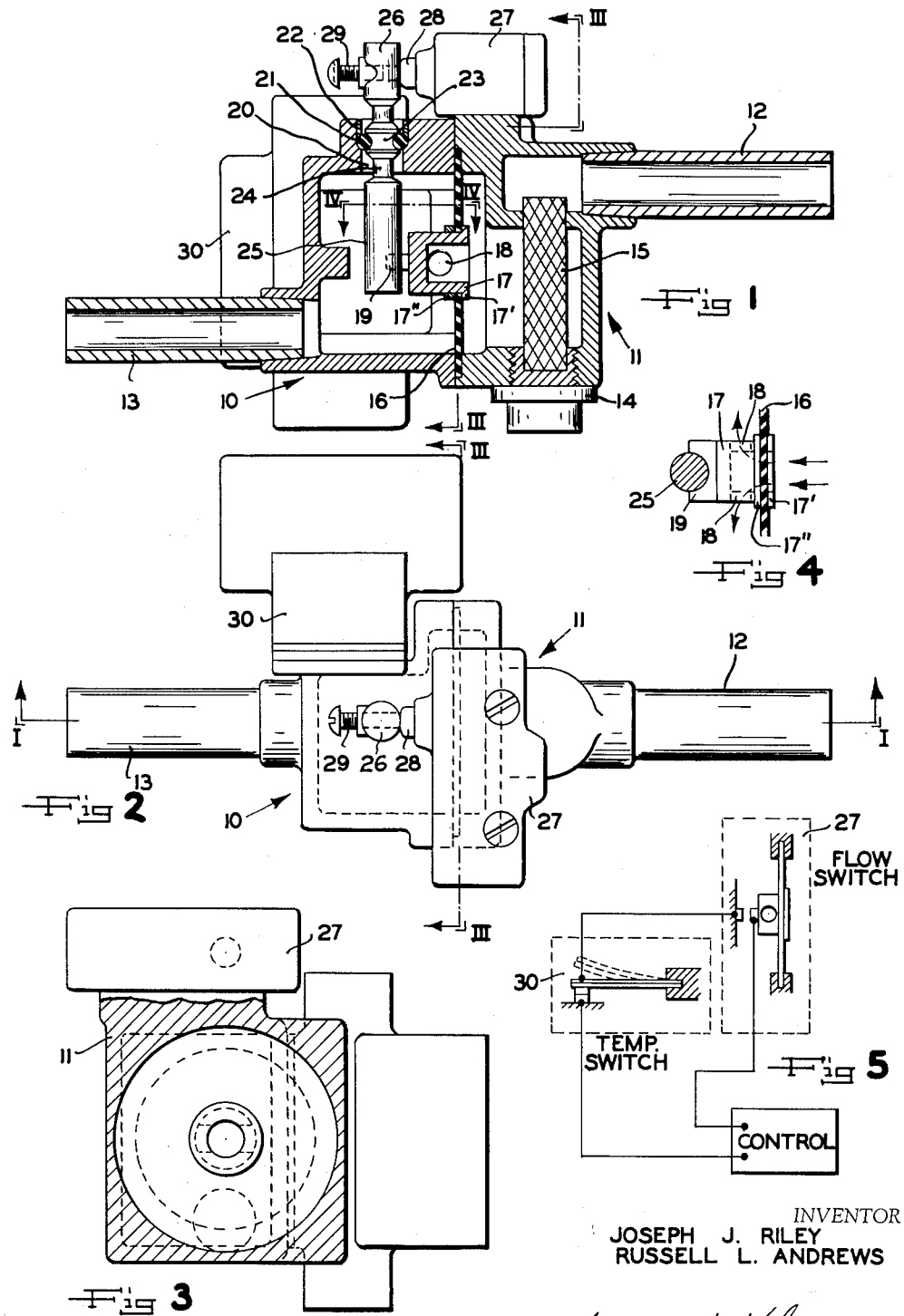

2,734,106

APPARATUS FOR MONITORING THE FLOW OF A COOLING FLUID

Joseph J. Riley and Russell L. Andrews, Warren, Ohio, assignors to The Taylor Winfield Corporation, Warren, Ohio, a corporation of Ohio Application February 28, 1952, Serial No. 274,028

4 Claims. (Cl. 200—81.9)

This invention relates to improved apparatus for monitoring the flow of a cooling fluid and more particularly to such apparatus including an improved switching device which is operative to establish or to interrupt an electrical circuit in response to the existence of a predetermined rate of flow in a fluid conduit. Such apparatus is widely used for protective purposes in electronic discharge devices, for example, where operation of the discharge devices for even short periods of time without the presence of the normal flow of cooling fluid required therefor will result in serious damage or complete ruin of the devices. Inasmuch as such devices are commonly employed in an intermittent manner with suitable valve means to stop the flow of the cooling medium during inoperative periods, and since the conduits and passages for the cooling medium may be quite small and thus readily clogged, it is desirable that any such fluid flow responsive protective apparatus be quick-acting, sensitive, and entirely dependable in operation. Further, since such protective devices are required in large numbers in various control applications it is desirable that they be small and compact and capable of being economically produced and assembled. Of particular importance is the elimination of sliding joints or other constructional features which make for decreased sensitivity and unpredictable frictional values which result in erratic operation.

It is accordingly the primary object of our invention to provide an improved fluid flow responsive switch which while being simple and economical in design is nevertheless highly sensitive in response and of improved dependability as regards consistency in operation. Another object of the invention is the provision of such an improved flow switch which is entirely leakproof, in which all moving parts are immune to corrosive attack, in which operation is entirely independent of variations in the pressure of the cooling medium, and in which the assembled devices can be incorporated in the complete control apparatus in any position.

Another object of the invention is the provision in a fluid flow responsive device of an improved arrangement for regulating or adjusting the rate of flow at which the device will operate.

A further object of the invention is the provision of an improved protective system for monitoring the flow of a cooling fluid through apparatus the temperature of which is to be cooled so as to indicate either an abnormal decrease in the rate of flow of the cooling medium or an abnormal increase in the temperature of such medium, or both, whereby complete and unfailing protection is provided for the apparatus requiring a controlled temperature. In the preferred embodiment of our invention at least a portion of the outer casing of the flow responsive assembly is made of metal having a high coefficient of heat transmission and on such portion is mounted in heat exchanging relation therewith a normally closed thermostatic switch which is adapted to open upon the temperature of the cooling fluid exceeding a predetermined value. A normally open switch is arranged to be actuated by the flow responsive element whereby through suitable circuitry the initiation or continuance of operation of the electronic discharge device or other component to be protected is prevented either if the flow of coolant is insufficient or if the coolant itself attains an excessive temperature.

The above and other objects and advantages of the invention will become apparent upon consideration of the following detailed specification and the accompanying drawing wherein there is disclosed a preferred embodiment of the invention.

In the drawing:

Figure 1 is a longitudinal section of control apparatus constructed in accordance with the principles of our invention;

Figure 2 is a plan view of the apparatus of Figure 1;

Figure 3 is a transverse sectional view taken along the lines III—III of Figures 1 and 2;

Figure 4 is a fragmentary section taken along the line IV—IV of Figure 1; and

Figure 5 is a schematic showing of a control circuit operated by the apparatus shown.

The apparatus illustrated comprises a casing made of two parts 10 and 11 which are preferably of die cast construction and connected with the casing part 11 is a liquid inlet tube 12 while an outlet tube 13 is connected to the casing part 10. Suitably carried by a screw-threaded plug 14 received in casing part 11 is a tubular screen 15 through which the liquid must pass after entering through tube 12.

Peripherally clamped between adjacent faces of the casing parts 10 and 11 is a diaphragm 16 which may be made of rubber or other fluid impervious material of sufficient yieldability to enable the center portion of the diaphragm to be axially displaced appreciably in response to a force being exerted thereagainst. Diaphragm 16 is formed with a centrally disposed aperture in which is received a thimble-like fitting 17 having its open end directed toward the space contained in casing part 11. For the purpose of mounting the fitting the open end thereof is flanged as shown at 17' to engage one side of the diaphragm 16 while a clamp ring 17" is screw-threaded onto the body portion of the fitting 17 to forcibly engage the opposite side of the diaphragm to thereby securely clamp a portion of the diaphragm 16, thus securely mounting the fitting 17.

Any suitable means, not shown, may be employed to hold the casing parts 10 and 11 in assembled relation with the peripheral edge of the diaphragm 16 clamped therebetween.

The tubular side wall of the fitting 17 is formed with a pair of diametrically opposed apertures 18 which communicate with the space in casing part 10 and extending rearwardly from the closed end of fitting 17 is a yoke 19.

The top wall of casing part 10 is formed with a shoulder aperture 20 and resting against the shoulder therein is a toroidal shaped ring 21 of resilient deformable material, commonly termed an O ring. Ring 21 is preferably made of neoprene, a synthetic rubber. Ring 21 is retained in position by a split keeper ring 22 which is forced into the aperture 20 after the ring 21 as will be understood.

Ring 21 tightly engages an annular groove 23 formed in an intermediate portion of a stem 24, the inner end portion 25 of which is engaged within the yoke 19 and the outer end portion 26 of which is positioned exteriorly of the casing part 10. In addition to providing a mounting means for the stem 24 the yieldable ring 21 also forms a fluid type fulcrum for the stem enabling the same to be rocked about a horizontal axis lying in the plane of the ring and, further, provides inherent spring action timing to keep the stem 24 in a predetermined position. The parts heretofore described are so dimensioned that normally the lower end portion 25 of the stem 24 has light pressure engagement with the yoke 19 with the diaphragm 16 only slightly biased to the right as viewed in Figure 1. If now the fitting 17 is moved to the left, as will occur when fluid is flowing through the casing 10, 11, stem 24 will be rocked in a clockwise direction but upon withdrawal of the force acting through fitting 17 both the fitting 17 and the lower portion 25 of the stem 24 will return to their normal positions.

A small commercial type of snap acting switch 27 having a button-type of operator 28 is secured to and carried by the casing part 11 in such position that its operator may be engaged by the end of an adjustable screw 29 which is received in a screw threaded aperture extending diametrically through the outer portion 26 of the stem 24.

Rigidly mounted on the casing part 10 in appropriate heat exchanging relation therewith is a thermostatic switch 30 which is normally closed but adapted to be opened upon the temperature of the casing part 10 reaching a predetermined degree as would occur if the temperature of the liquid passing through the casing attains a sustained rise.

The two switches 27 and 30 are connected in series in a suitable control circuit as suggested in Figure 5 and in actual practice such control circuit is utilized to interrupt the operation of the device being cooled if for any reason there is an insufficient flow of cooling liquid through the device and/or if the temperature of the cooling liquid coming from the device is excessive. Therefore, the apparatus herein described will be positioned in the coolant discharge conduit of the device and normally the switch 27 as well as the switch 30 will be closed during operation of the device.

Switch 27 is closed only during normal flow of cooling liquid through the casing 10, 11. By referring to Figures 1 and 4 it will be observed that the liquid entering through tube 12 enters the tubular mesh screen 15 axially and thence passes radially out through the side wall of the screen and axially into the fitting 17. To escape from the fitting 17 the liquid flow must make a right angle bend and in doing so there is exerted on the fitting 17 an axial force which is proportional to the velocity of the liquid flow. The fitting 17 is free to move axially in response to the application of this force because of the flexibility of the diaphragm 16 and upon the liquid velocity attaining a predetermined value the fitting 17, and consequently the stem 25 will be displaced sufficiently to close the switch 27. Therefore if the rate of liquid flow falls below a predetermined minimum value the safety switch 27 will be opened. This operation is entirely independent of pressure since if for example the outlet tube 13 should become clogged pressure will build up equally on opposite sides of the diaphragm 16 thus allowing the switch 27 to open. The use of the screen 15 and the relatively large dimension of the outlet apertures 18 of the fitting 17 precludes the possibility of clogging in the fitting 17.

The desired rate of liquid flow through the control apparatus may be regulated either by varying the dimension of the apertures 18 in the fitting 17 or by adjusting the operating screw 29 inwardly or outwardly to acquire a less or greater extent of movement of the fitting 17 for actuating the switch 27.

The switch 30 insures that regardless of the rate or volume of liquid flow through the device an indication will be given if the temperature of the flowing liquid reaches a dangerously high degree as may be caused, for example, by continued overloading of the device being cooled or by the use of a cooling medium having too high a temperature in the first instance.

It should now be apparent that we have provided improved apparatus for monitoring the flowing of a cooling fluid which accomplishes the objects initially set out. The apparatus of the invention is sensitive, quick acting and adequately provides for all abnormal conditions which may be encountered in the flow of the cooling medium. The switches and other sensitive moving parts are mounted externally of the fluid flow and thus are protected from corrosive attack. This external mounting of the thermostatic switch is further advantageous in that it provides a short thermal lag so that its operation is based on an average rather than an instantaneous temperature condition. This is desirable when the device being cooled emits large quantities of heat only intermittently as, for example, ignitrons in electric resistance welding apparatus which control the flow of the welding current.

Having thus described our invention what we claim is new and desire to secure by Letters Patent is:

1. A flow responsive switch comprising a fluid impervious casing having an inlet port and an outlet port, a diaphragm within said casing intermediate said inlet and outlet ports and having a centrally disposed aperture, a thimble-like fitting carried by said diaphragm within said aperture and having an axial opening therein open in the direction of said inlet port, said fittings having an aperture in its side wall for discharging fluid from said axial opening on the outlet port side of said diaphragm, and a movable switch operator engaged by said fitting and extending through a side wall of said casing.

2. Apparatus according to claim 1 further characterized in that said switch operator comprises a stem-like member loosely received in an aperture in said side wall and having its inner end portion engaged by said fitting, an annular groove in said stem-like member, and a resilient deformable O-ring tightly received in said groove and in said last mentioned aperture.

3. A flow switch comprising a fluid impervious casing made of two mating sections one of which has an inlet port while the other of which has an outlet port, a diaphragm having its peripheral edge portion clamped between said sections and having a centrally disposed aperture, a thimble-like fitting carried by the central portion of said diaphragm and having an axial opening therein open in the direction of said inlet port and having an opening in its side wall communicating with said outlet port, the arrangement being such that the center portion of said diaphragm and said fitting is displaced axially in the direction of said outlet port during the flow of fluid through said casing, and switch means having operative connection with said fitting and adapted to be actuated upon said axial movement of said fitting.

4. Apparatus according to claim 3 further characterized in that said switch means comprises a switch mounted on the outside of said casing and an operator therefor comprising a stem-like member fulcrumed in an aperture formed in the side wall of said casing, the inner end portion of said stem-like member being engaged by said fitting and the outer portion of said stem-like member engaging said switch.

References Cited in the file of this patent

UNITED STATES PATENTS

| | | |
|---|---|---|
| 1,814,235 | Trogner | July 14, 1931 |
| 2,509,504 | Jensen | May 30, 1950 |
| 2,583,814 | Burklin | Jan. 29, 1952 |

FOREIGN PATENTS

| | | |
|---|---|---|
| 644,105 | Germany | Apr. 24, 1937 |